United States Patent [19]

Taylor

[11] Patent Number: 5,084,782
[45] Date of Patent: Jan. 28, 1992

[54] DECORATIVE TAPE
[75] Inventor: Roy Y. Taylor, Scottsville, N.Y.
[73] Assignee: Eastman Kodak Company, Rochester, N.Y.
[21] Appl. No.: 631,125
[22] Filed: Dec. 20, 1990
[51] Int. Cl.[5] .............................................. G02B 5/12
[52] U.S. Cl. .................... 359/515; 359/530
[58] Field of Search .................. 350/97, 98, 100, 103, 350/109; 362/309

[56] References Cited

U.S. PATENT DOCUMENTS

| | | | |
|---|---|---|---|
| 3,779,629 | 12/1973 | Green | 359/530 |
| 4,034,555 | 7/1977 | Rosenthal | 58/127 R |
| 4,634,220 | 1/1987 | Hockert et al. | 359/619 |
| 4,799,137 | 1/1989 | Aho | 362/309 |
| 4,895,428 | 1/1990 | Nelson et al. | 359/530 |

Primary Examiner—Loha Ben
Attorney, Agent, or Firm—Tallam I. Nguti

[57] ABSTRACT

An optical tape for use decoratively includes a back portion of a first color, a serrated front portion made of a clear plastic. The serrations include alternating wide and narrow grooves such that a side of a wide groove adjoins a side of a narrow groove at an angle of substantially 90°. The sides of each narrow groove have a second color. When the tape is viewed from a distant point, only the first color of the back portion is seen, but when viewed from up-close, substantially only the second color of the narrow grooves is seen.

7 Claims, 1 Drawing Sheets

DECORATIVE TAPE

BACKGROUND OF THE INVENTION

1. Field of the Invention

The present invention relates to optical films, and more particularly to such a film which is suitable for use as a decorative tape.

2. Description Relative to the Prior Art

Optical films and film systems are well known. Some include layers of micro-lenses, and others include only light transmission and reflective material layers. For example, U.S. Pat. No. 4,034,555, issued July 12, 1977 in the name of Rosenthal discloses an optical sheet system which includes lenticular lens sheets through which two images can be viewed at two different angles. U.S. Pat. No. 4,634,220, issued Jan. 6, 1987 in the name of Hockert et al. discloses an optical sheeting system which is directionally imaged with images that are viewable within a limited range of angles. Another example is U.S. Pat. No. 4,799,137, issued Jan. 17, 1989 in the name of Aho which discloses an optical film that can reflect light at a predetermined constant angle relative to the angle of incidence of such light. Such films and film systems can, of course, be adapted for use advantageously in products such as lighting fixtures, as well as in other optical systems so as to produce particular and desired optical effects. One such advantageous use can be as a decorative tape which can be used commercially (as trade dress), for example, on a consumer product.

SUMMARY OF THE INVENTION

It is an object of the present invention to provide a decorative tape which produces desired and advantageous optical effects.

It is a further object of the present invention, to provide an optical tape that is imaged and the image appearance of which changes from a first image to a second image between distant and close-up views.

In accordance with the present invention, an optical tape having a width W and a thickness T is provided for use decoratively in the vertical plane of a surface of a product. Thickness-wise, the tape comprises a back portion, and a front portion for viewing therethrough to the back portion. The back portion has an adhesive back surface which is suitable for bonding to a surface of such a product, such that the width W extends in the vertical plane of such a surface. The tape has a first viewable image which is formed on the front surface of the back portion. The front portion of the tape is made of a transparent material, and has a substantially flat front surface and a widthwise serrated back surface which is in bonded contact with the back portion of the tape. The serrated back surface of the front portion includes alternating wide and narrow grooves which each has first and second sides such that the first and second sides of each narrow groove adjoin the second and first sides of adjacent wide grooves. The optical tape also has a second viewable image formed on the first and second sides of each narrow groove.

BRIEF DESCRIPTION OF THE DRAWINGS

In the detailed description of the invention presented below, reference is made to the drawing which is an enlarged cross-section of the optical tape of the present invention illustrating light rays reflected from the tape and viewed by an observer at up-close and distant locations therefrom.

DETAILED DESCRIPTION OF THE INVENTION

Figure 1:
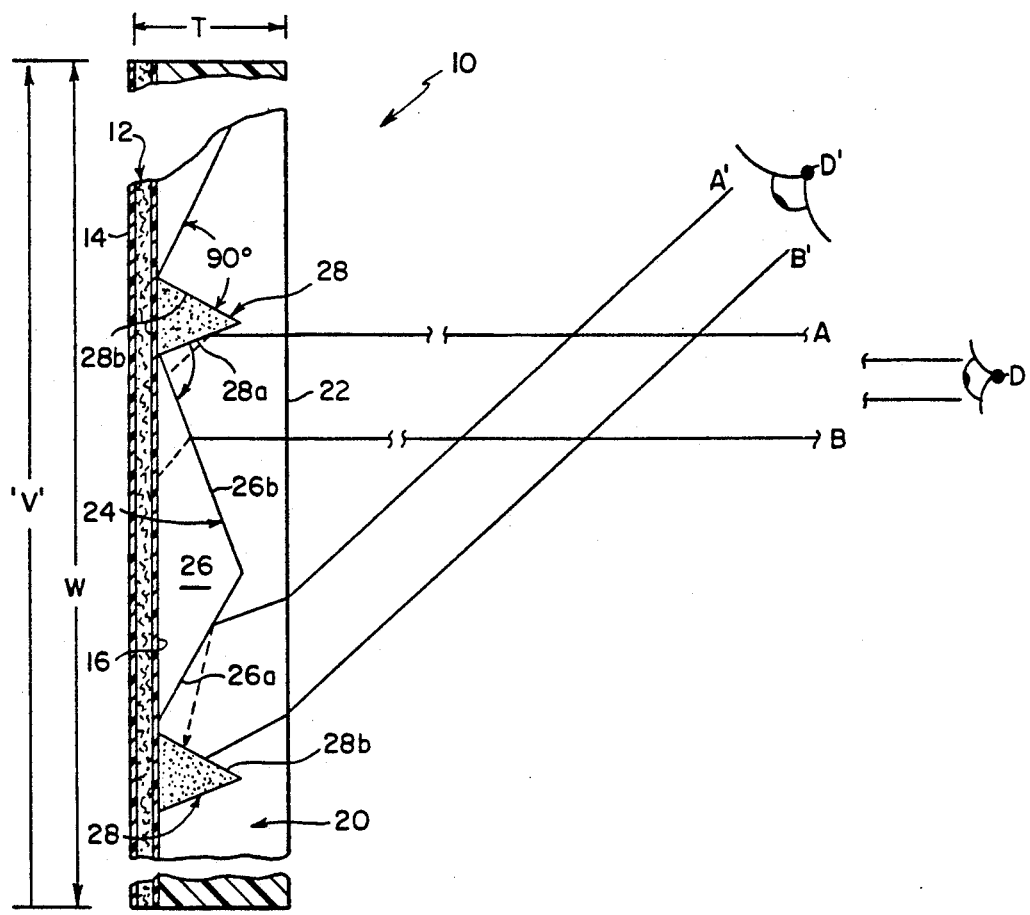

Referring now to the drawing, the optical tape shown generally as 10 has a width W and a thickness T, and thickness-wise includes a back portion 12 which can be made of an opaque material, and which has an adhesive back surface 14 suitable for bonding to a surface in the vertical plane 'V' of a product such as a copier or printer or other article to be decorated. The back portion 12 also has a front surface 16 thereto on which is formed a first viewable image. The first viewable image can be a solid first color or pigment, for example black. The tape 10 also includes thickness-wise a front portion 20 that has a substantially flat front surface 22 for viewing therethrough to the back portion 12. The front portion 20 is made of a transparent material such as a clear plastic.

As shown, the front portion 20 also has a widthwise serrated back surface 24 which is in bonded contact with the back portion 12. As further shown, the serrated back surface 24 of front portion 20 includes alternating wide and narrow grooves 26, 28, respectively, which each have first and second sides or flanks 26A, 26B and 28A, 28B, respectively, formed as shown. The wide grooves 26 may be made shallower than the narrow grooves 28. The grooves 26, 28 are formed such that adjoining sides of adjacent grooves, for example, sides 26B and 28A form an angle of substantially 90°. Similarly, adjoining sides 26A and 28B also form an angle of substantially 90°. As shown, a second image is formed on the first and second sides 28A, 28B, respectively, of each narrow groove 28. Such a second image, for example, can also be a solid second color or pigment that fills the groove 28. The second color for example can be yellow, or it can be a pattern of the special trade colors of a corporation, or a special trade dress of a product.

When the back surface 14 of the tape 10 is adhered to a product for viewing in the vertical plane 'V' as illustrated from vantage points D and D', the tape 10 advantageously will appear to have only the first viewable image color, for example, black, or only the second viewable image color, for example, yellow, depending on whether the tape is being viewed respectively from a long distance or from up close. As illustrated, when the tape 10, as adhered, is viewed from a long distance vantage point D, a directrix for example, A or B will substantially be normal to the surface 22, and light rays along such a directrix will pass therethrough unaffected. Light rays along the directrix A, for example, on passing through the transparent surface 22 strike side 28A of a narrow groove 28, and are reflected onto and through the adjoining side 26B of a wide groove 26. As a result, the eye from the long distance point D sees only the first image or color on the surface 16 of the back portion 12. Light rays along the directrix B, for example, on also passing through the surface 22 strike the adjoining side 26B of a wide groove 26, and are refracted therethrough. The result is that the eye again sees only the first image or color on the surface 16 of back portion 12. From the distant point D, a viewer therefore sees only the first image or first color, for example black, on the front surface 16 of the back portion 12.

However, when the tape 10 is viewed from an up-close point, for example, D', a directrix from the eye, for example, A' or B', will form an angle of substantially less than 90° with the surface 22. As a result, light rays along each directrix strike the surface 22 and are refracted therethrough as shown towards the back surface 24 of front portion 20. The rays along the directrix A', for example, are then reflected off the side 26A of a wide groove onto the adjoining side 28B of a narrow groove. As a result, the eye at point D' sees substantially only the second image or color, for example, the color yellow on such side 28. The rays along the directrix B' as shown, for example, are refracted through the surface 22 directly onto the side 28B where again the eye at point D' sees substantially only the second image or color, for example, yellow. Therefore, from the up-close point D', a viewer sees substantially only the second image or color. Accordingly, the tape 10, as such, can be used decoratively in the vertical plane of a surface of a product such as a copier or printer, or other article so as to achieve desirable and advantageous optical effects.

The invention has been described in detail with particular reference to a presently preferred embodiment, but it will be understood that variations and modifications can be effected within the spirit and scope of the invention.

What is claimed is:

1. An optical tape, having a width W and a thickness T, for use decoratively in a vertical plane of a surface of a product, the optical tape comprising:
    (a) a back portion having an adhesive back surface suitable for bonding to a surface of such product such that the width W extends in the vertical plane of such surface;
    (b) a first viewable image formed on the front surface of said back portion;
    (c) a transparent front portion overlying the back portion for viewing therethrough to said back portion and having a substantially flat front surface and a serrated back surface in bonded contact with said back portion, said serrated back surface of said front portion including alternating wide and narrow grooves each having first and second sides, such that the first and second sides of each narrow groove adjoin respectively the second and first sides of adjacent wide grooves in the widthwise direction; and
    (d) a second viewable image formed on said first and second sides of each narrow groove.

2. The optical tape of claim 1 wherein said first viewable image is a solid color.

3. The optical tape of claim 1 wherein said back portion is made of an opaque material.

4. The optical tape of claim 1 wherein said transparent material of said front portion is a clear plastic material.

5. The optical tape of claim 1 wherein said second viewable image is a solid color.

6. The optical tape of claim 1 wherein each such side of a narrow groove adjoins the respective side of an adjacent wide groove at an angle of about 90°.

7. A decorative tape for providing visible images when viewed in one orientation by an observer, the tape comprising:
    (a) a back portion having a first image thereon; and
    (b) a transparent front portion having a substantially flat front surface and a serrated rear surface, the serrations on the rear surface thereof including alternating wide and narrow grooves, the sides of the narrow grooves containing a pigment forming a second image.

* * * * *